Figure 1:
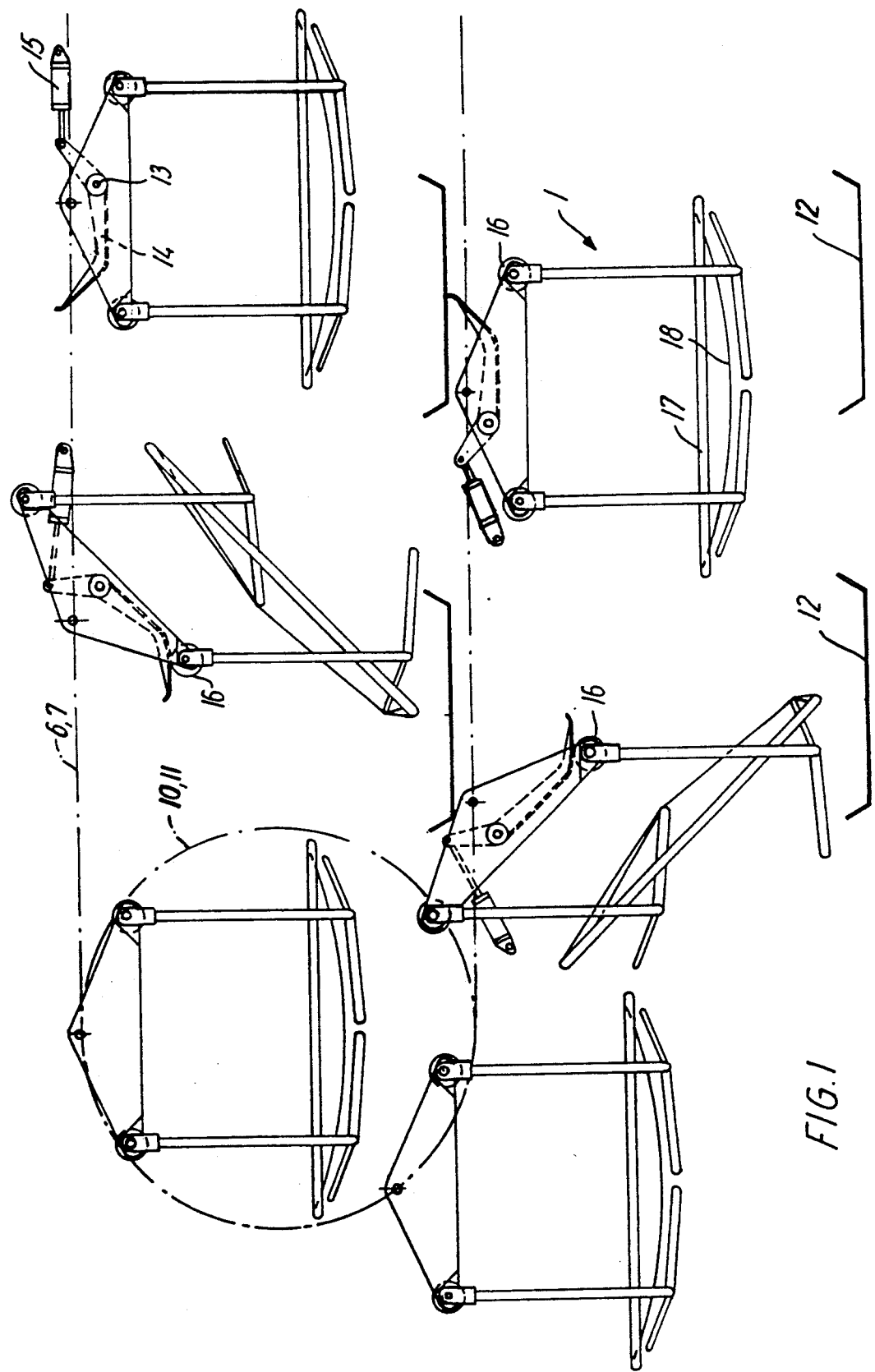

United States Patent [19]

Solund

[11] Patent Number: 5,190,135
[45] Date of Patent: Mar. 2, 1993

[54] TRAY FOR USE IN A SORTING MACHINE

[75] Inventor: Jørgen Sølund, Tappernoje, Denmark

[73] Assignee: ITS-Intern Transport Systems A/S, Tappernoje, Denmark

[21] Appl. No.: 836,341
[22] PCT Filed: Aug. 31, 1990
[86] PCT No.: PCT/DK90/00226
§ 371 Date: Mar. 2, 1992
§ 102(e) Date: Mar. 2, 1992
[87] PCT Pub. No.: WO91/03324
PCT Pub. Date: Mar. 21, 1991

[30] Foreign Application Priority Data

Sep. 1, 1989 [DK] Denmark .............. 4335/89

[51] Int. Cl.$^5$ ............................. B65G 47/46
[52] U.S. Cl. ................. 198/365; 198/477.1; 198/715
[58] Field of Search ............ 198/365, 477.1, 680, 198/706, 715

[56] References Cited

U.S. PATENT DOCUMENTS

| 2,017,046 | 10/1935 | Hanna et al. | 198/715 |
| 4,565,277 | 1/1986 | Benier | 198/365 |
| 4,805,780 | 2/1989 | Solund | 198/706 |

FOREIGN PATENT DOCUMENTS 155207B 2/1987 Denmark .
0022602 1/1981 European Pat. Off. .
2560524 11/1985 Fed. Rep. of Germany .

Primary Examiner—Joseph E. Valenza
Attorney, Agent, or Firm—Browdy and Neimark

[57] ABSTRACT

A tray for use in a sorting machine consists of a rectangular frame (17) which is covered with fabric (18). The frame (17) is pivotally suspended from two U-shaped rods (19) and is horizontal in the position of equilibrium. The frame (17) can be pivoted from the position of equilibrium to an inclined discharge position. During this, discharge (22, 25) or (23, 24) hit the fabric (18) and stretches it so that emptying of the contents of the tray takes place rapidly and effectively.

2 Claims, 3 Drawing Sheets

TRAY FOR USE IN A SORTING MACHINE

The invention concerns a tray of the type stated in the introductory portion of claim 1.

The Danish Patent Specification 155 207 discloses a sorting machine containing a plurality of trays, which are moved in an endless path and can be pivoted about a pivot axis by a selectively controllable activation means for emptying the contents of the tray on a desired unloading means.

EP-A1-022602 discloses a tray which together with a plurality of similar trays is suspended from a conveyor. These trays are used for transporting lumps of dough. To avoid sticking of the dough lumps to the substrate, which is a cloth passed around some smooth rods, one of these rods is provided with an anti-slip material on the surface and is rotated evenly during transport, such that the cloth, on which the dough rests, is constantly displaced and such that the dough rolls in a sagging part of the cloth.

The object of the invention is to provide an improved tray which may be used e.g. in the mentioned known sorting machine.

This object is achieved according to the invention in that the tray stated in the opening paragraph is characterized by the features defined in the characterizing portion of claim 1.

Loading of the tray with parcels takes place in that the parcels fall down on the tray. The parcels then hit the fabric-covered frame which mitigates the drop so that the parcels are protected against damage, and the sorting machine operates with less noice than with the previously used trays.

When at least one of the two-armed levers of the tray is activated by an activation means, known per se, in the sorting machine, the pivoted suspension of the fabric-covered frame causes the frame to pivot from the horizontal position of equilibrium to an inclined discharge position in the support, in which it is pivotally suspended in the two-armed levers.

The support consists of the U-shaped rods on which discharge means are secured, and which, in the inclined discharge position of the frame, engage and stretch the fabric on the frame so that the parcels are almost thrown off or slide easily down from the tray.

Figure 2:
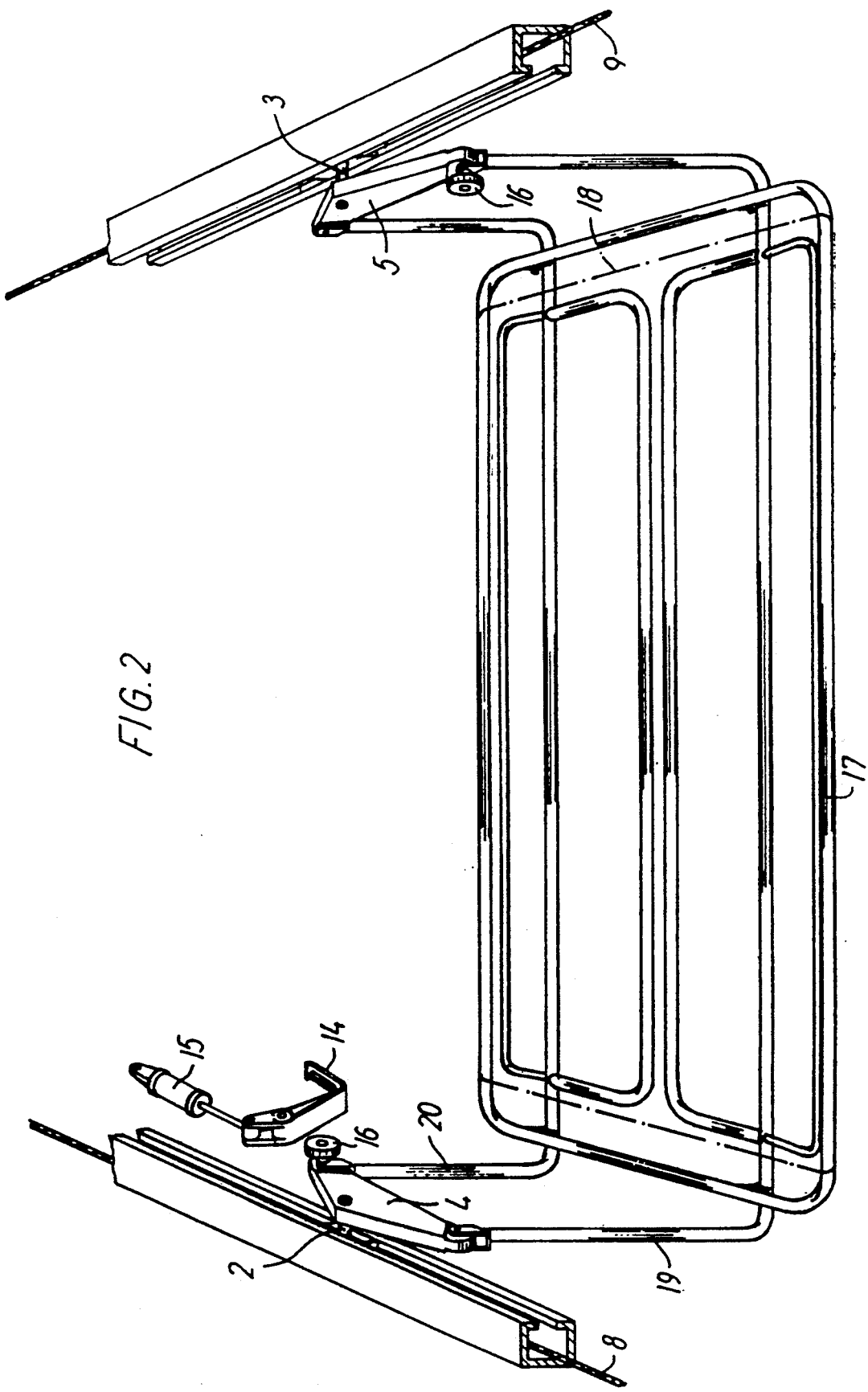
Figure 3:
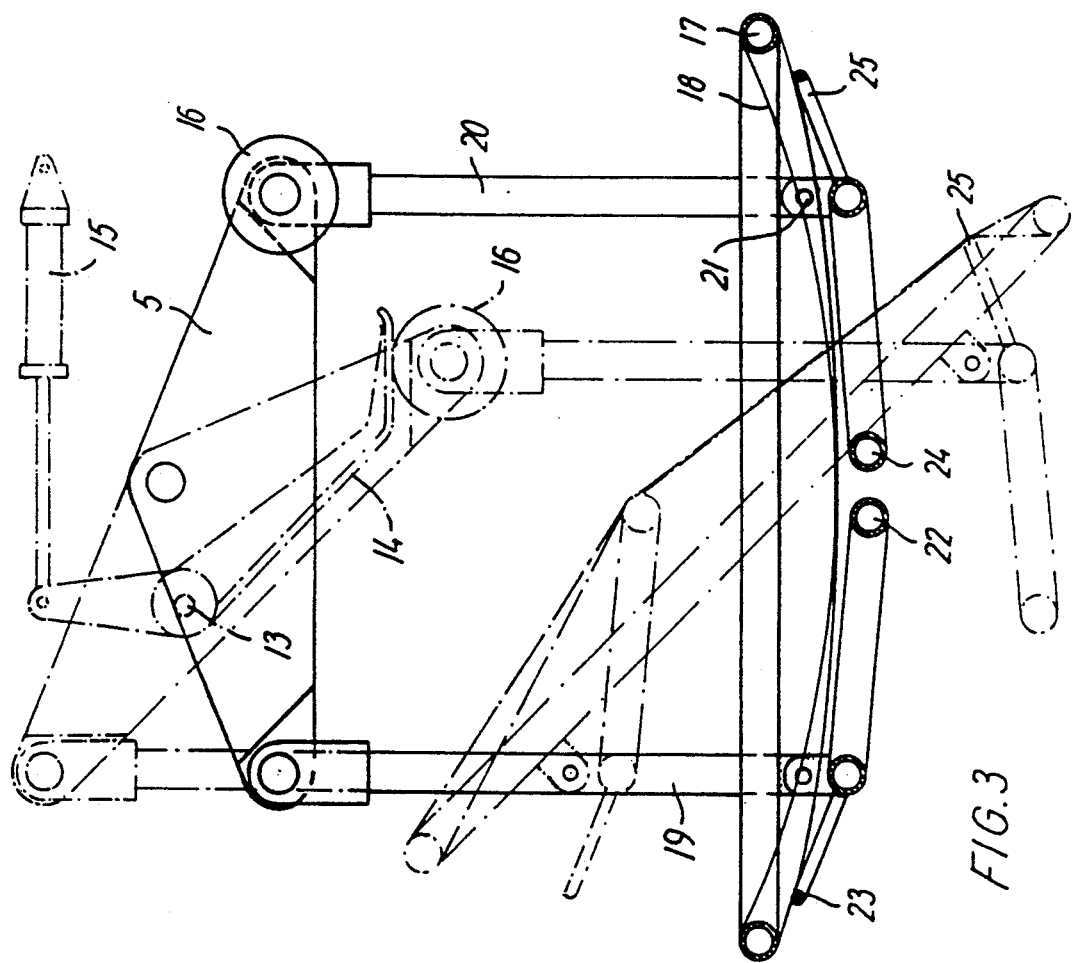
Figure 4:
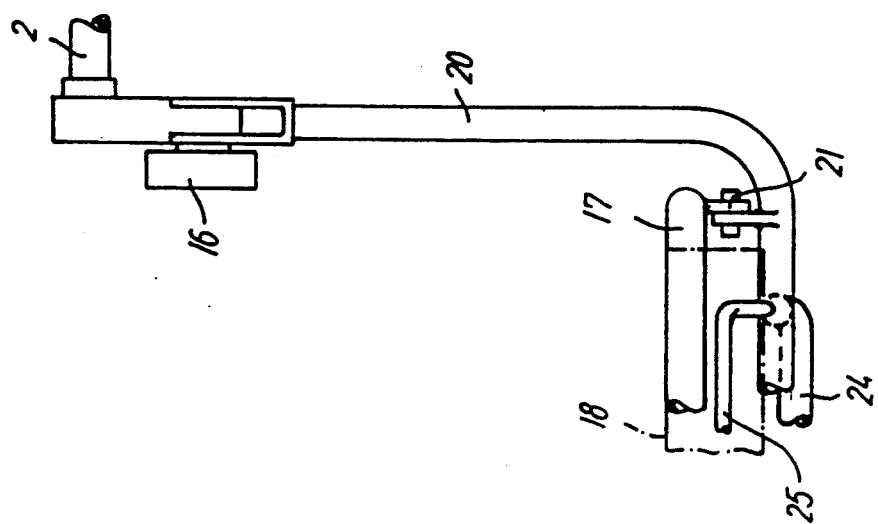

The invention will be explained more fully below with reference to the drawing, in which FIG. 1 schematically shows one end of a sorting machine known from the Danish Patent 155 207, in which the tray known from said patent has been replaced by the tray of the invention, FIG. 2 is a perspective view of the tray of the invention in a horizontal position of equilibrium, FIG. 3 is a lateral view of the tray from FIG. 1 and shows in broken lines the same tray which has been pivoted from the horizontal position of equilibrium to an inclined discharge position, and FIG. 4 shows the right side of the tray in FIG. 3 from the end.

The sorting machine shown in FIG. 1 contains a plurality of trays which are generally designated 1 and shown in more detail in FIG. 2. These trays are pivotally suspended at both sides in pivots 2, 3 in the center of their respective two-armed levers 4 and 5, respectively. The pivots 2, 3 are secured to their respective ones between two chains 7 and 8 driven in synchronism and by the same drive motor (not shown), said chains being shown in broken lines in FIG. 1. The chains 6 and 7 preferably consist of steel wires 8, 9, which are placed around a chain wheel at each end of the sorting machine.

Since only one end of the sorting machine is shown in the drawing, only one pair of chain wheels 10 and 11 is visible for each steel wire 8 and 9, respectively.

Below the trays in both the upper and the lower run of the path, a plurality of stationary chutes 12 is placed at even intervals in a machine frame (not shown), in which a corresponding number of levers 14 is secured, said levers being pivotable about a horizontal shaft 13.

The levers 14 can be caused to assume an activated state by means of their respective pneumatic cylinders 15, during which the associated lever 14 is caused to engage a projection in the form of a wheel 16 on the two-armed lever 4 or 5 of a tray 1. Consequently, the tray 1 in question is pivoted from the horizontal position of equilibrium to an inclined discharge position in which the contents of the tray 1 are emptied onto a chute 12 disposed below.

When the levers 14 are not activated, the trays 1 just pass unaffected.

Feeding to the sorting machine is affected from a feeding unit (not shown), which may be placed in any desired stationary position above the upper or lower run of the path, and the contents of the trays 1 are automatically controlled for emptying into a chute 12 determined by an identification code on each tray 1.

One of the trays 1 incorporated in the sorting machine is shown more fully in FIGS. 2, 3 and 4.

The tray 1 consists of a rectangular frame 17 which is covered with fabric 18 as shown in dotted line. The frame 17 is pivotally suspended from a support 19, 20 in bearings or hinge joints 21. The support 19, 20 consists of two U-shaped rods 19 and 20 whose upwardly free ends are pivotally journalled in the ends of the two-armed levers 4, 5, which appears in particular from FIG. 2.

The horizontal portion from each of the U-shaped rods 19 and 20 mounts discharge means in the form of other U-shaped rods 22, 23 and 24, 25, respectively.

As shown in particular in FIG. 3, these discharge means 22-25 are disposed below the fabric 18. When the projection 16 of the tray 1 hits a lever 14, whose pneumatic cylinder 15 has been activated, the tray 1 is tilted from the horizontal position of equilibrium shown in solid line in FIG. 3 to the inclined discharge position shown in dotted line in FIG. 3.

During this movement the rods 22 and 25 of the discharge means hit the underside of the fabric 18 and stretch the fabric as shown in dotted line in FIG. 3, so that the parcels (not shown) easily slide off the tray 1.

It is clear for reasons of symmetry that the tray 1 in FIG. 3 can also be emptied to the other side, during which the other rods 23 and 24 of the discharge means hit and stretch the fabric 18.

Further, in another type of sorting machine the trays might be suspended from a single steel wire, and in that case the trays are rotated 90° about a vertical line. In this embodiment, the contents of the trays will be emptied to one or the other side of the transport direction of the steel wire.

I claim:

1. A tray (1), e.g. for use in a sorting machine of the type wherein articles or parcels are transported on a plurality of such trays (1), which are moved along in an endless path and are pivotable from a horizontal position of equilibrium to an inclined discharge position by a selectively controllable activation means (14) for discharging the contents of each tray (1) on to a desired unloading means (12), said tray (1) consisting of a retangular frame (17) which is covered by a fabric (18) or a similar material, which is suspended at both sides from a support in pivots (2, 3) in the centre of two-armed levers (4, 5), characterized in that the support consists of two U-shaped rods (19, 20) to which discharge means (22, 23 and 24, 25) are secured, said discharge means hitting and stretching the fabric (18) on the rectangular frame (17) when the tray is pivoted from the horizontal position of equilibrium to the inclined discharge position to one or the other side.

2. A tray according to claim 1, characterized in that at least one of the two-armed levers (4, 5) carries a projection, e.g. a wheel (16), and that with a view to pivoting the tray (1) to the inclined discharge position an activation means (14) is moved into the travelling path of the wheel (16) to engage the wheel (16) during the passage thereof.

* * * * *